United States Patent
Lathrop

(10) Patent No.: US 8,766,489 B2
(45) Date of Patent: Jul. 1, 2014

(54) ACTIVE TRANSFER TIME DELAY FOR AUTOMATIC TRANSFER SWITCH

(75) Inventor: Todd M. Lathrop, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 500 days.

(21) Appl. No.: 13/219,783

(22) Filed: Aug. 29, 2011

(65) Prior Publication Data

US 2013/0049476 A1 Feb. 28, 2013

(51) Int. Cl.
H01H 47/00 (2006.01)
(52) U.S. Cl.
USPC .......................................................... 307/125
(58) Field of Classification Search
USPC .................................................. 307/64, 125
See application file for complete search history.

(56) References Cited

U.S. PATENT DOCUMENTS

| | | | |
|---|---|---|---|
| 4,398,097 A | 8/1983 | Schell et al. | |
| 4,747,061 A | 5/1988 | Lagree et al. | |
| 4,760,278 A | 7/1988 | Thomson | |
| 4,894,796 A | 1/1990 | Engel et al. | |
| 5,081,367 A | 1/1992 | Smith et al. | |
| 5,210,685 A | 5/1993 | Rosa | |
| 5,397,868 A | 3/1995 | Smith et al. | |
| 6,801,109 B2 | 10/2004 | Simms | |
| 6,849,967 B2 | 2/2005 | Lathrop et al. | |
| 7,336,003 B2 | 2/2008 | Lathrop et al. | |
| 7,948,117 B2 | 5/2011 | Lathrop et al. | |
| 2004/0076148 A1* | 4/2004 | Ferry et al. | 370/389 |
| 2008/0179958 A1 | 7/2008 | Lathrop et al. | |

* cited by examiner

*Primary Examiner* — Robert L. Deberadinis
(74) *Attorney, Agent, or Firm* — Eckert Seamans Cherin & Mellott, LLC; Kirk D. Houser

(57) ABSTRACT

An automatic transfer switch includes first and second inputs inputting first and second voltages; a first output outputting a start signal; a first timer timing a first time after the second voltage is available; a second timer delaying for up to a second time before outputting a transfer signal, the second time being reduced by the first time when the second voltage is available; a transfer mechanism selectively electrically connecting one of the inputs to a second output; and a circuit cooperating with the inputs and the transfer mechanism, causing the start signal to be output responsive to the voltages not being available, and causing the transfer mechanism to electrically connect the second input to the second output in response to the transfer signal.

18 Claims, 5 Drawing Sheets

ACTIVE TRANSFER TIME DELAY FOR AUTOMATIC TRANSFER SWITCH

BACKGROUND

1. Field

The disclosed concept pertains generally to transfer mechanisms and, more particularly, to automatic transfer switches for selectively feeding power from one of two input lines to a load.

2. Background Information

Alternate power sources are provided for any number of applications, which cannot withstand a lengthy interruption in electric power. Typically, power is provided from a primary source with back-up power provided by a secondary source. Often, the primary source is a utility power source and the secondary source is an auxiliary power source, such as an engine driven generator or a second utility power source. The transfers between the two power sources can be made automatically or manually.

Transfer switches are well known in the art. See, for example, U.S. Pat. Nos. 7,948,117; 7,336,003; 6,849,967; 6,801,109; 5,397,868; 5,210,685; 4,894,796; and 4,747,061. Transfer switches operate, for example, to transfer a power consuming load from a circuit with a normal power source to a circuit with an auxiliary power source. Applications for transfer switches include stand-by applications, among others, in which the auxiliary power source stands-by if the normal power source should fail. Facilities having a critical requirement for continuous electric power, such as hospitals, certain plant processes, computer installations, and the like, have a standby power source, often a diesel generator. A transfer switch controls electrical connection of the utility lines and the diesel generator to the facility load buses. In many installations, the transfer switch automatically starts the standby generator and connects it to the load bus upon loss of utility power, and reconnects the utility power source to the load bus if utility power is reestablished.

Transfer switches commonly used to connect alternate power sources to a load, including networks, utilize a pair of power contacts each connecting one of the sources to the load. In order to prevent connecting unsynchronized sources together, the operation of the two power contacts is coordinated, typically by an interlock mechanism (e.g., mechanical and/or electrical), in order that only one power contact at a time can be turned on. In many instances, it is desirable to operate the transfer switch remotely. Typically, electric motors or solenoids have been used to operate the interlock mechanism on transfer switches. See, for example, U.S. Pat. Nos. 5,081,367; 4,760,278; and 4,398,097.

A transfer switch typically comprises a pair of power contacts, power contactors or circuit interrupters combined with a drive input and a linkage system. The preferred types of circuit interrupters have been molded-case switches and molded-case circuit breakers because these types are commercially available in a wide array of sizes and are relatively economical compared to other options. The preferred type of drive input depends on the application for the transfer switch. Usually motors or solenoids are preferred, but at other times there is a clear preference for manually-operated mechanisms.

Residential type automatic transfer switches, for example, have built-in time delays that allow for several steps to occur in sequence in order to ensure the least amount of interruption to the end user. For instance, there is a time delay engine start that allows for the utility to operate automatic reclosures before the automatic transfer switch starts the engine-generator. This time delay protects against un-needed engine starts.

Another time delay is the time delay before transfer to the engine-generator after it is running. This is typically done to allow the engine-generator to properly warm up before applying a load to it. Upon loss of utility power, the automatic transfer switch starts and warms up the engine-generator prior to transfer of the load to the generator. This warm up time is fixed.

There is room for improvement in automatic transfer switches.

SUMMARY

This need and others are met by embodiments of the disclosed concept, which, for example, actively decrease warm up time when an engine-generator is already running due to an engine test or some other reason not related to a utility outage, since the full warm up time is no longer necessary.

In accordance with one aspect of the disclosed concept, an automatic transfer switch comprises: a first input structured to input a first voltage from a first power source; a second input structured to input a second voltage from a second power source; a first output structured to output a start signal to the second power source; a first timer structured to time a first time after the second voltage is available; a second timer structured to delay for less than or equal to a second time before outputting a transfer signal, the second time being reduced to not less than zero by the first time when the second voltage is available; a second output; a transfer mechanism structured to selectively electrically connect one of the first input and the second input to the second output; and a circuit cooperating with the first input, the second input and the transfer mechanism, the circuit being structured to cause the start signal to be output by the first output responsive to the first and second voltages not being available, the circuit also being structured to cause the transfer mechanism to electrically connect the second input to the second output in response to the transfer signal.

The second power source may be an engine and a generator; and the first time may be between zero and the second time when the engine was already running prior to the first voltage not being available.

The generator may run unloaded for a period of time that is the second time of the second timer minus the first time of the first timer.

The circuit may comprise a third timer structured to delay for a third time; and the circuit may be further structured to bypass the second timer after the third timer times for the third time when the first voltage is not available and when the second voltage is available for at least as long as the second time.

The first and second voltages may both not be available; and the circuit may be further structured to output the start signal after the third timer delays for the third time.

As another aspect of the disclosed concept, a controller is for an automatic transfer switch comprising a first input structured to input a first voltage from a first power source, a second input structured to input a second voltage from a second power source, a first output structured to output a start signal to the second power source, a second output, and a transfer mechanism structured to selectively electrically connect one of the first input and the second input to the second output. The controller comprises: a first timer structured to time a first time after the second voltage is available; a second timer structured to delay for less than or equal to a second time before outputting a transfer signal, the second time being reduced to not less than zero by the first time when the second voltage is available; and a circuit cooperating with the first input, the second input and the transfer mechanism, the circuit being structured to cause the start signal to be output by the first output responsive to the first and second voltages not being available, the circuit also being structured to cause the transfer mechanism to electrically connect the second input to the second output in response to the transfer signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

Figure 1:
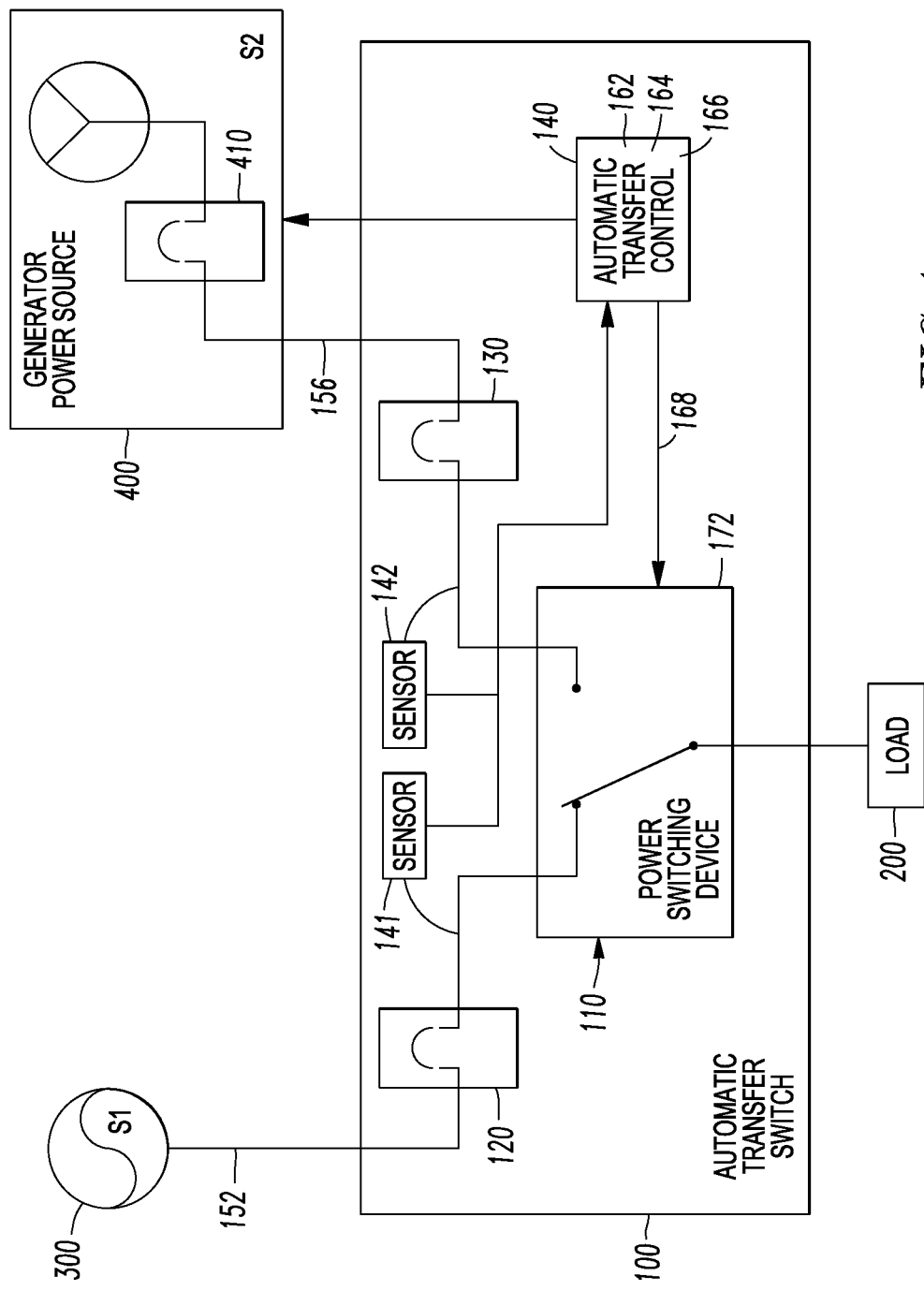
FIG. 1 is a block diagram of a transfer switch installation including an automatic transfer switch in accordance with embodiments of the disclosed concept.

Referring to FIG. 1, an automatic transfer switch (ATS) 100 selectively provides electrical power to a load 200 from multiple alternate sources including a generator power source 400 and a utility power source 300. The transfer switch 100 allows the source of electric power supplied to the load 200 to be switched between the utility power source 300 and the generator power source 400. The load 200 represents one or more electrical devices within, for example, a commercial or residential structure (not shown) that employs electric power, such as for example and without limitation, lighting, plug-ins, appliances, commercial machinery and climate control systems. The utility power source 300 is a source of electric power from a commercial vendor (e.g., without limitation, a connection to an electrical grid maintained by a utility power company).

The generator power source 400 is, for example, an electric generator of a type commonly found near the exterior of a commercial or residential structure to provide a backup source of electric power to that structure in the event that the electric power supplied by the utility power source 300 becomes unstable (e.g., as in the case of a brownout) or fails, entirely. The generator power source 400 may incorporate a service disconnect 410 to disconnect power during maintenance and/or in the event of an overload of current being drawn from the generator power source 400. The generator power source 400 may be any of a wide variety of electric generators based on any of a variety of technologies, including but not limited to, solar energy, wind energy, geothermal energy, or fossil fuel energy through either a fuel cell or an internal combustion engine.

The automatic transfer switch 100 incorporates a power switching device 110 and a controller, such as the example automatic transfer control 140 or any suitable processor. The automatic transfer switch 100 may also incorporate one or both of service disconnects 120 and 130. Electric power from the utility power source 300 is routed via one or more conductors to the power switching device 110, and is routed through the service disconnect 120 if the service disconnect 120 is present. Electric power from the generator power source 400 is routed via one or more conductors from the generator power source 400 to the power switching device 110, and is routed through the service disconnect 130 if the service disconnect 130 is present. The power switching device 110 is caused to select either the utility power source 300 or the generator power source 400 to supply electric power that is routed via one or more conductors from the power switching device 110 to the load 200.

The power switching device 110 may be any of a wide variety of devices or combinations of devices that provide the function of both making and breaking electrical connections for the routing of electric power from one of multiple electrical sources. For example, it is widely known to use one or more sets of relays and/or contactors as a power switching device.

The service disconnects 120, 130 and 410 may be any of a wide variety of devices or combinations of devices providing both protection against too great a flow of current and manual disconnection capability. A widely known and very common form of device employed as a service disconnect is a circuit breaker. Circuit breakers commonly provide a manual operating handle by which disconnection can be effected, and/or a shunt trip (e.g., without limitation, a magnetic coil that when energized by an external power source causes the circuit breaker to enter an open state). Widely known and commonly used combinations of devices serving as a service disconnect are a fuse and either a latching relay or latching contactor where disconnection is caused by breaking the circuit conveying power for latching.

During normal operation of the automatic transfer switch 100, the power switching device 110 is normally caused by the automatic transfer control 140 to select the utility power source 300 as the source of electric power to be supplied to the load 200, but can be caused to select the generator power source 400 when the electric power supplied by the utility power source 300 becomes unstable or fails. The automatic transfer control 140 is an electronic circuit that causes the power switching device 110 to select between the utility power source 300 and the generator power source 400 in response to the receipt of one or more inputs. Such inputs may include, for example and without limitation, an indication of the input voltage level supplied by one or both of the utility power source 300 and the generator power source 400 failing to meet a desired specification (e.g., without limitation, failing to stay within 5% of a standard 115 VAC level or a 60 Hz frequency), an indication of the amount of current being drawn from either of these power sources failing to stay within a desired limit (e.g., without limitation, failing to stay within the maximum current capacity of a conductor or power source), or a timer input.

More particularly, voltage and/or other sensors may be employed to directly monitor the voltages, frequencies, current flow and/or other characteristics of the power supplied by the utility power source 300 and the generator power source 400. In embodiments of the automatic transfer switch 100 in which one or both of the service disconnects 120 and 130 are provided, such sensors may be positioned between the power switching device 110 and one or both of the service disconnects 120 and 130, as exemplified by depicted sensors 141 and 142. This may be done to detect a loss of power at one or both of the power inputs to the power switching device 110 as a result of one or both of the service disconnects 120 and 130 being opened, thereby disconnecting the power supplied by one or both of the utility power source 300 and the generator power source 400. Alternatively, the service disconnects 120, 130 and/or 410 may be structured to allow the automatic transfer control 140 to directly monitor their status. During normal operation, the automatic transfer control 140 may respond to the opening of one or more of the service disconnects 120, 130 and 140 by causing the power switching device 110 to switch between the utility power source 300 and the generator power source 400 in an effort to maintain a supply of power to the load 200.

The automatic transfer control 140 may also be provided with the ability to turn the generator power source 400 on or off. During normal operation, the automatic transfer control 140 may respond to instability or complete loss of power from the utility power source 300 by signaling the generator power source 400 to turn on to provide power. The automatic transfer control 140 may further signal the generator power source 400 to turn off when stable power is once again being supplied by the utility power source 300. The automatic transfer control 140 may further be provided with the ability to monitor one or more aspects of the status of the generator power source 400, such as without limitation, the amount of available fuel remaining for the generator power source 400 (e.g., without limitation, depletion of the fuel to an extent that a fuel tank is only 10% full). During normal operation, a shortage of available fuel for the generator power source 400 may cause the automatic transfer control 140 to limit the amount of time during which the automatic transfer control 140 signals the generator power source 400 to be turned on.

The disclosed concept addresses a time delayed transfer (time delay normal to emergency (TDNE)) by the automatic transfer switch 100 from, for example and without limitation, the utility power source 300 to the engine-generator power source 400. Most residential transfer switch controllers employ fixed, hard-coded timers, DIP switches that allow minimal choices in the time delay, or fully programmable timers. However, known automatic transfer switches do not employ active control in how the TDNE time delay works. Regardless of the state of the engine-generator power source 400, be it not running, running due to exercise (e.g., without limitation, an engine test), or running due to a power outage, a TDNE engine-generator delay timer 166 (FIG. 2) is always counted down. When not running or running due to exercise, this time is needed to allow the engine-generator power source 400 to warm up before transfer by the automatic transfer switch 100. In the case that the engine-generator power source 400 is already running for greater than or equal to the time of the TDNE time delayed transfer, however, this time can be bypassed automatically and the load 200 immediately transferred to the engine-generator power source 400 after another timer, the time delay engine start (TDES) timer 162 (FIG. 2) that allows for the utility power source 300 to operate automatic reclosures before the automatic transfer switch 100 starts the engine-generator power source 400, is counted down. The TDES timer 162 is allowed to time out before a transfer in order to allow re-closers to perform their primary function prior to locking out and removing utility power.

When the engine-generator power source 400 is already running for a sufficient time as defined by another timer, the S2 available timer (S2 AVAILABLE) 164 (FIG. 2), the disclosed automatic timer bypass decreases the amount of time that the load 200 is without power by the amount of time of the TDNE timer 166 (FIG. 2) (e.g., without limitation, typically about 20 seconds in the residential market).

The automatic transfer switch controller 140 knows how long the engine-generator power source 400 has been running based upon how long the backup power source (S2) has been available as determined by the first timer 164 (FIG. 2) that times a first time after the backup power source voltage 156 is available, and allows the engine-generator power source 400 to run unloaded for a period of time that is the difference between the time remaining on the second TDNE timer 166 (FIG. 2) and the time the engine-generator power source 400 has actually been running as measured by the first timer 164. Hence, the generator 404 (FIG. 2) runs unloaded for a period of time that is the second time of the second timer 166 (FIG. 2) minus the first time of the first timer 164. Also, the controller logic can be set up to bypass the TDNE timer 166 all together based on the needs of the customer, but only when the engine-generator power source 400 is already running due to an engine test (e.g., without limitation, initiated automatically by the ATS 100; initiated manually by the user; initiated by an input from a Smart Grid utility; initiated by a timer; some other reason that is not related to a utility outage).

Figure 2:
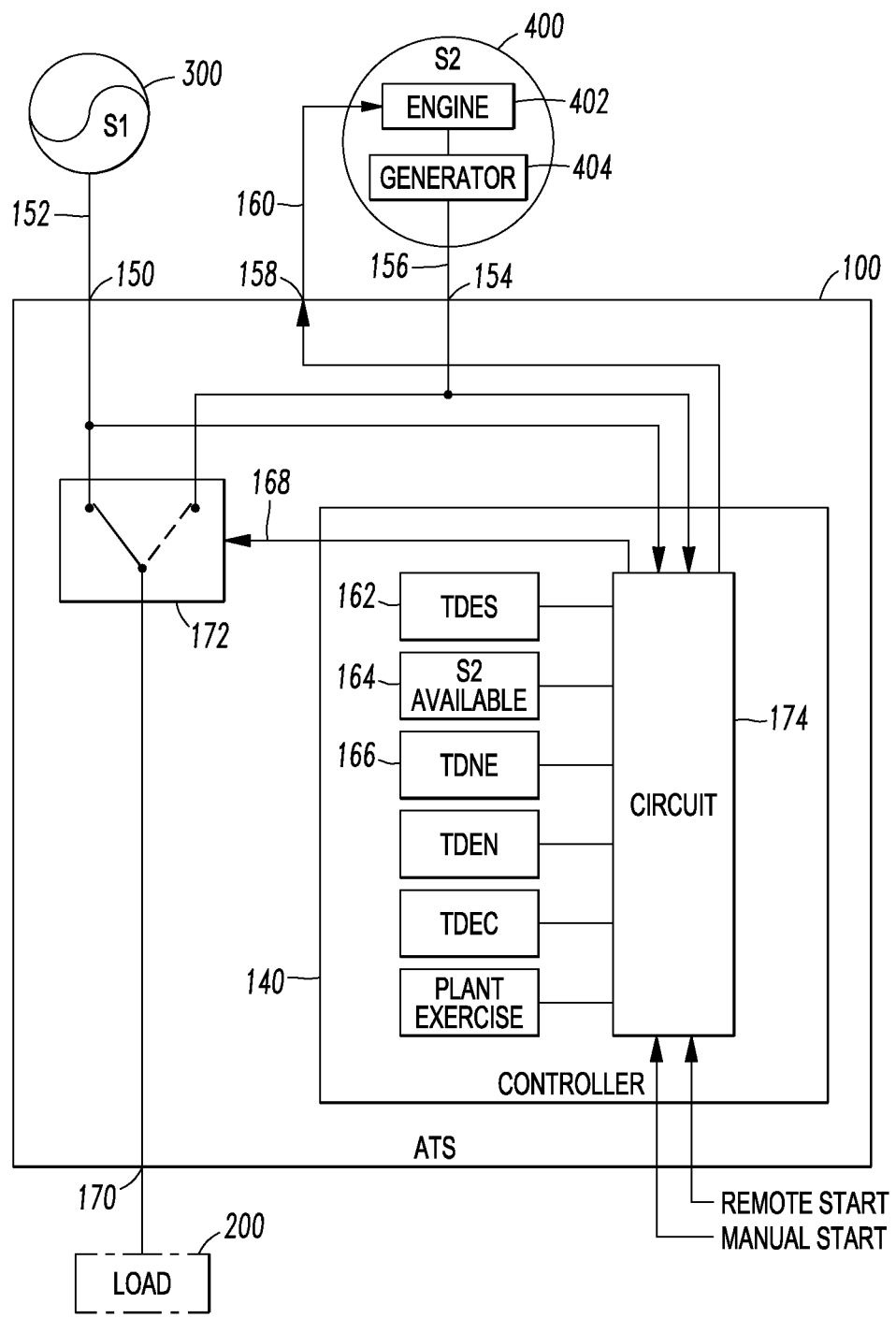
FIG. 2 is a block diagram of the automatic transfer switch of FIG. 1.

Referring to FIG. 2, the ATS 100 includes a first input 150 structured to input a first voltage 152 from the first power source (S1) 300; a second input 154 structured to input a second voltage 156 from the second power source (S2) 400; a first output 158 structured to output a start signal 160 to the second power source 400; the third timer (TDES) 162 structured to delay for a third time; the first timer (S2 AVAILABLE) 164 structured to time a first time after the second voltage 156 is available; the second timer (TDNE) 166 structured to delay for less than or equal to a second time before outputting a transfer signal 168, the second time being reduced to not less than zero by the first time when the second voltage 156 is available; a second output 170 for the load 200 (shown in phantom line drawing); a transfer mechanism 172 structured to selectively electrically connect one of the first input 150 and the second input 154 to the second output 170; and a circuit 174 cooperating with the first input 150, the second input 154 and the transfer mechanism 172, the circuit 174 being structured to cause the start signal 160 to be output by the first output 158 responsive to the first and second voltages 152,156 not being available, the circuit 174 also being structured to cause the transfer mechanism 172 to electrically connect the second input 154 to the second output 170 in response to the transfer signal 168.

The example second power source 400 includes an engine 402 and a generator 404. The first time is between zero and the second time when the engine 402 was already running prior to the first voltage 152 not being available.

The disclosed concept does not load the engine-generator power source 400 before it has been properly warmed up. A user initiated transfer could be initiated while the power source engine 402 is already running. If it is, then the TDNE timer 166 will function as has been described based on the amount of time the power source engine 402 has been running. If the power source engine 402 was not running, then the TDNE timer 166 will time out before transfer is initiated.

Figure 3A:
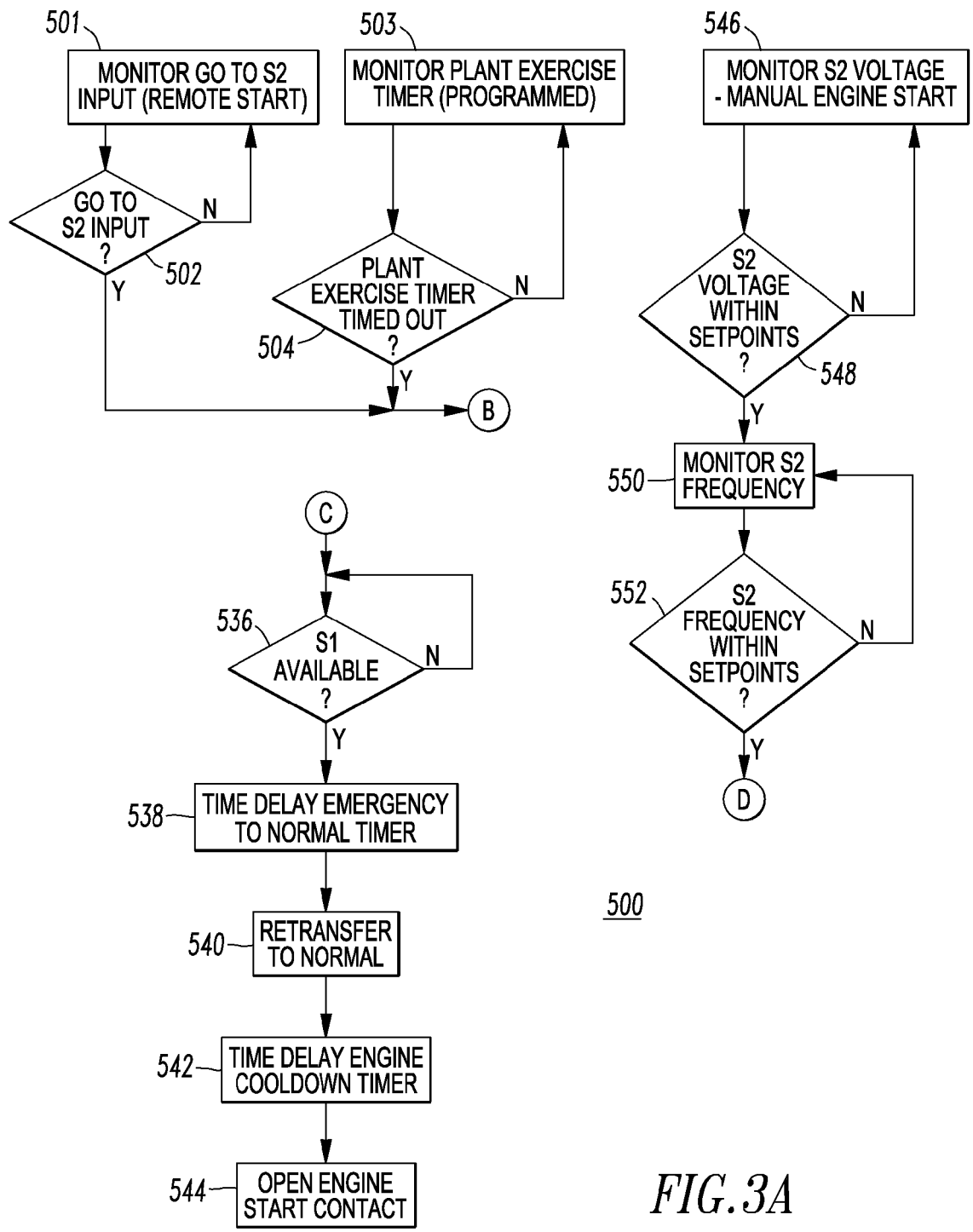
FIGS. 3A-3C form a flowchart of a controller routine for the controller of FIG. 1.
Figure 3B:
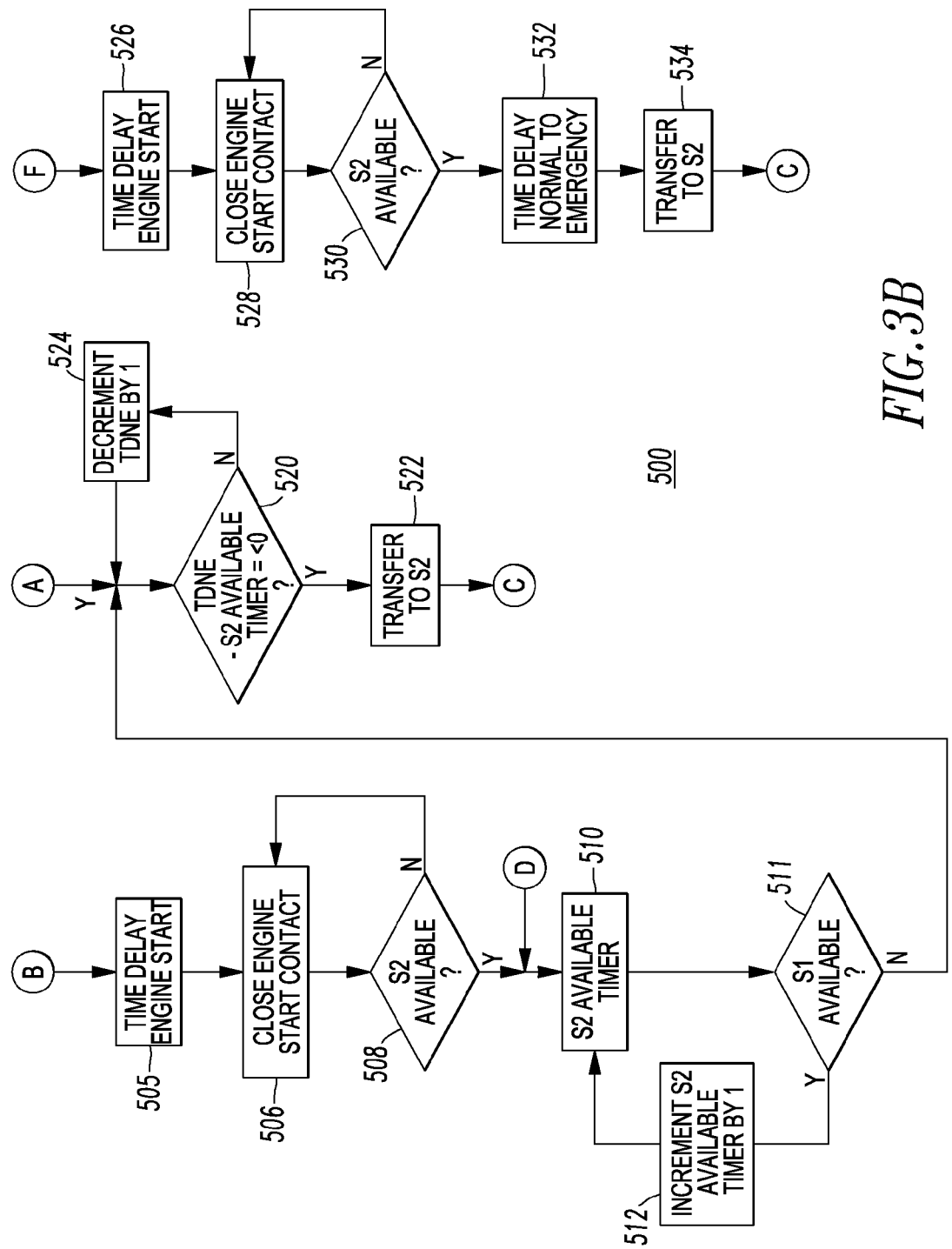
Figure 3C:
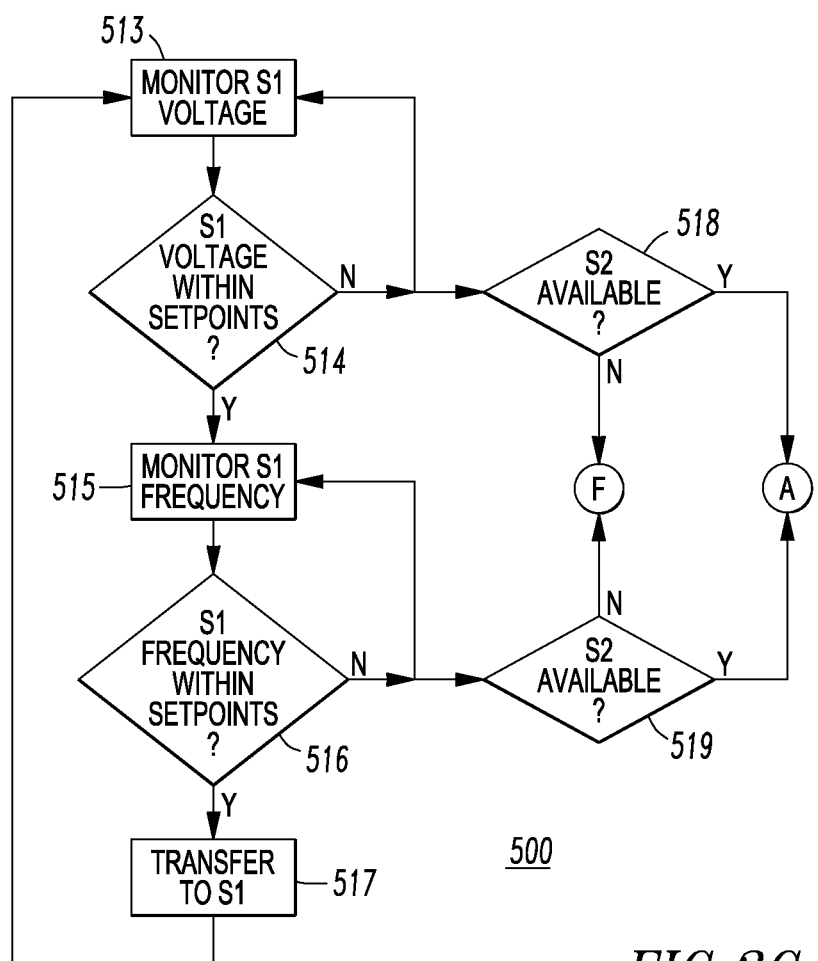

Referring to FIGS. 3A-3C, a controller routine 500 is shown. The controller routine 500 monitors various inputs, voltages and frequencies on a repetitive basis at 501, 503, 546, 550, 513 and 515. At 501, a remote start input (FIG. 2) is monitored. The remote start input, for example, may come from a utility (not shown) for load shedding functions or from a remote operator panel (not shown) when storms are in the area. If active at 502, then execution resumes at 505 (FIG. 3B). At 503, a plant exercise timer (FIG. 2) is monitored. If a plant exercise is set, then it will run at specified intervals for specified periods of time. If active at 504, then execution resumes at 505 (FIG. 3B).

At 505 of FIG. 3B, the time delay engine start delay (TDES) timer 162 (FIG. 2) is timed. Upon timeout of the TDES timer 162, an engine start contact is closed at 506 to output the start signal 160 (FIG. 2). Next, at 508, it is determined if S2 is available. At 508, "available" means that both voltage and frequency are within predetermined setpoints (e.g., without limitation, preset or programmed logic; user defined). If not, then the engine start contact is maintained closed at 506. Otherwise, if S2 is available, then, at 510, the S2 available timer 164 (FIG. 2) times. Next, at 511, it is determined if S1 is available. If so, then, at 512, the S2 available timer 164 is incremented by one (e.g., without limitation, one second) before step 510 is repeated to provide a suitable delay (e.g., without limitation, one second). The S2 AVAILABLE timer of 510 is reset to zero after transfer to S2 at 522 or when S2 is no longer available. This is so that the S2 available timer 164 can be used in the calculation at 520. If S1 is not available, then the S2 available timer 164 is no longer needed and execution resumes at 520. The S2 available timer 164 functions when both S1 and S2 are available.

Referring to FIG. 3C, the ATS controller 140 repetitively monitors the S1 input at 513 and 515 for availability. At 513, the S1 voltage is monitored. At 514, it is determined if the S1 voltage (any suitable number of phases) is within setpoints. If so, then the S1 frequency is monitored at 515. At 516, it is determined if the S1 frequency (any suitable number of phases) is within setpoints. If so, then a transfer to S1 is initiated or maintained at 517 by outputting the transfer signal 168 (FIG. 2).

Otherwise, if S1 is not available at 514, then at 518 it is determined if S2 is available. If so, then execution resumes at 520 of FIG. 3B. Similarly, if S1 is not available at 516, then at 519 it is determined if S2 is available. If so, then execution resumes at 520 of FIG. 3B. If either of the tests at 518 and 519 fail, then execution resumes at 526 of FIG. 3B.

At 520 of FIG. 3B, it is determined if the time of the TDNE timer 166 (FIG. 2) less the elapsed time of the S2 available timer 164 (FIG. 2) is less than or equal to zero. If so, then the ATS 100 transfers to S2 at 522 by outputting the transfer signal 168 (FIG. 2). If not, then, at 524, the time of the TDNE timer 166 (FIG. 2) is decremented by one (e.g., without limitation, one second) before step S20 is repeated. The example timers 162,164,166 are, for example and without limitation, in seconds. The TDNE timer 166 is either preset or programmed to a set time to delay the transfer to S2. This permits the engine-generator power source 400 (FIG. 2) to warm up and stabilize the S2 output voltage 156 and frequency before a load (e.g., 200) is applied to it. The test at 520 ensures that the proper time for warm up is occurring regardless of the state of S2 prior to the loss of S1. For example, if S2 is available for 10 seconds before S1 is lost (e.g., with TDNE set at 20 seconds), then this counts down TDNE for 10 seconds (from 20 to 10 seconds) before completing the transfer to S2. As another example, if the TDNE time delay of the second timer 166 is 20 seconds and an engine test was only running for 9 seconds, then the net time delay of the first timer 164 is 11 seconds after the expiration of the third TDES timer 162 at 505. In this case, S2 is available and timed during TDES. So if TDES=5 seconds, then S2 AVAILABLE will time the 5 seconds also so the net time is now 6 seconds and not 11 seconds. At 520, the circuit 174 bypasses the second TDNE timer 166 after the third timer 162 times for the third time at 505 when the first voltage 152 is not available at 511 and when the second voltage 156 is available at 508, 510 and 512 for at least as long as the second time.

Otherwise, if S2 is not available at 518 or 519, then, at 526, the TDES timer 162 is timed. Next, at 528, the engine start contact (not shown) is closed. Here, when the first and second voltages 152,156 are both not available as determined at 514,516,518,519, the circuit 174 outputs the start signal 160 at 528 after the TDES timer 162 delays. Then, at 530, it is determined if S2 is available. If not, then 528 is repeated. Otherwise, if S2 is available, then, at 532, the TDNE timer 166 is run until it times out. Then, at 534, the ATS 100 transfers to S2. Preferably, the third TDES timer 162 is independent of whether the engine 402 is running or is not running.

Next, at 536 of FIG. 3A, it is determined if S1 is available. If not, then 536 is repeated. Otherwise, at 538, a time delay emergency to normal (TDEN) timer (FIG. 2) is timed. Next, at 540, a re-transfer to normal (S1) is initiated by outputting the transfer signal 168 (FIG. 2). Then, at 542, a time delay engine cool down (TDEC) timer is executed. Finally, the engine start contact (not shown) is opened at 544 after the retransfer to S1.

Referring again to FIG. 3A, the ATS controller 140 monitors the S2 input at 546 and 550 for availability in response to a manual start input (FIG. 2). If manual start is selected, then the engine 402 is manually started to verify operation (e.g., after the engine is serviced, it can be run to ensure proper fluid levels, pressures, to check for leaks). At 546, the S2 voltage 156 is monitored. At 548, it is determined if the S2 voltage (any suitable number of phases) is within setpoints. If so, then the S2 frequency is monitored at 550. At 552, it is determined if the S2 frequency (any suitable number of phases) is within setpoints. If so, then execution resumes at 510 (FIG. 3B).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. An automatic transfer switch comprising:
a first input structured to input a first voltage from a first power source;
a second input structured to input a second voltage from a second power source;
a first output structured to output a start signal to said second power source;
a first timer structured to time a first time after the second voltage is available;
a second timer structured to delay for less than or equal to a second time before outputting a transfer signal, the second time being reduced to not less than zero by the first time when the second voltage is available;
a second output;
a transfer mechanism structured to selectively electrically connect one of said first input and said second input to said second output; and
a circuit cooperating with said first input, said second input and said transfer mechanism, said circuit being structured to cause the start signal to be output by said first output responsive to the first and second voltages not being available, said circuit also being structured to cause said transfer mechanism to electrically connect said second input to said second output in response to the transfer signal.

2. The automatic transfer switch of claim 1 wherein the second power source is an engine and a generator; and wherein the first time is between zero and the second time when the engine was already running prior to the first voltage not being available.

3. The automatic transfer switch of claim 2 wherein the generator runs unloaded for a period of time that is the second time of the second timer minus the first time of the first timer.

4. The automatic transfer switch of claim 2 wherein said circuit comprises a third timer structured to delay for a third time; and wherein said third timer is independent of whether the engine is running or is not running.

5. The automatic transfer switch of claim 2 wherein said circuit comprises a third timer structured to delay for a third time; and wherein said circuit is further structured to bypass the second timer after the third timer times for the third time when the first voltage is not available and when the second voltage is available for at least as long as the second time.

6. The automatic transfer switch of claim 1 wherein the second time is about 20 seconds.

7. The automatic transfer switch of claim 1 wherein said first power source is a utility power source.

8. The automatic transfer switch of claim 1 wherein said second power source is an engine-generator power source.

9. The automatic transfer switch of claim 1 wherein said circuit comprises a third timer structured to delay for a third time; wherein the first and second voltages are both not available; and wherein said circuit is further structured to output the start signal after the third timer delays for the third time.

10. A controller for an automatic transfer switch, said automatic transfer switch comprising a first input structured to input a first voltage from a first power source, a second input structured to input a second voltage from a second power source, a first output structured to output a start signal to said second power source, a second output, and a transfer mechanism structured to selectively electrically connect one of said first input and said second input to said second output, said controller comprising:
 a first timer structured to time a first time after the second voltage is available;
 a second timer structured to delay for less than or equal to a second time before outputting a transfer signal, the second time being reduced to not less than zero by the first time when the second voltage is available; and
 a circuit cooperating with said first input, said second input and said transfer mechanism, said circuit being structured to cause the start signal to be output by said first output responsive to the first and second voltages not being available, said circuit also being structured to cause said transfer mechanism to electrically connect said second input to said second output in response to the transfer signal.

11. The controller of claim 10 wherein the second power source is an engine and a generator; and wherein the first time is between zero and the second time when the engine was already running prior to the first voltage not being available.

12. The controller of claim 11 wherein the generator runs unloaded for a period of time that is the second time of the second timer minus the first time of the first timer.

13. The controller of claim 11 wherein said circuit comprises a third timer structured to delay for a third time; and wherein the third timer is independent of whether the engine is running or is not running.

14. The controller of claim 11 wherein said circuit comprises a third timer structured to delay for a third time; and wherein said circuit is further structured to bypass the second timer after the third timer times for the third time when the first voltage is not available and when the second voltage is available for at least as long as the second time.

15. The controller of claim 10 wherein the second time is about 20 seconds.

16. The controller of claim 10 wherein said first power source is a utility power source.

17. The controller of claim 10 wherein said second power source is an engine-generator power source.

18. The controller of claim 10 wherein said circuit comprises a third timer structured to delay for a third time; wherein the first and second voltages are both not available; and wherein said circuit is further structured to output the start signal after the third timer delays for the third time.

\* \* \* \* \*